United States Patent [19]

Tsumura et al.

[11] Patent Number: 4,521,276
[45] Date of Patent: Jun. 4, 1985

[54] CONCENTRATING APPARATUS

[75] Inventors: Kenji Tsumura, Nishinomiya; Masayuki Yamashita, Osaka, both of Japan

[73] Assignee: Oriental Metal Mfg. Co., Ltd., Hyogo, Japan

[21] Appl. No.: 373,155

[22] Filed: Apr. 29, 1982

[30] Foreign Application Priority Data

May 8, 1981 [JP] Japan .................. 56-69649

[51] Int. Cl.³ .............................................. B01D 1/22
[52] U.S. Cl. .................................. 159/1 W; 159/1 S; 159/14; 159/43.1; 159/15; 159/17.4; 159/17 C; 159/43 R; 159/49; 159/DIG. 15; 159/DIG. 28; 202/172; 202/174; 202/177; 202/234; 202/236; 203/72; 203/86; 203/DIG. 1
[58] Field of Search .................. 203/89, 86, 10, 11, 203/72, DIG. 1, 100; 202/236, 205, 234, 176, 177, 172, 174; 159/DIG. 28, 15, 13 R, 14, 43 R, 28 P, DIG. 27, 1 W, 1 S, 17 R, 17 C, 49, DIG. 15

[56] References Cited

U.S. PATENT DOCUMENTS

2,445,350  7/1948  Ginnings ........................... 202/172
2,530,376  12/1950  Castle et al. ............ 159/DIG. 28 X
3,161,574  12/1964  Elam ...................... 159/DIG. 28 X
3,477,917  11/1969  Rodgers ................. 159/DIG. 28 X
3,687,821  8/1972  Zalles .................................... 203/86
4,194,950  3/1980  Zalles .................................... 202/236
4,329,205  5/1982  Tsumura et al. .................. 159/28 P
4,475,988  10/1984  Tsumura et al. .................. 159/1 W Primary Examiner—Wilbur Bascomb
Attorney, Agent, or Firm—Armstrong, Nikaido Marmelstein & Kubovcik

[57] ABSTRACT

An apparatus for concentrating a dilute solution comprising a heat receiving thin plate which has a good thermal conductivity and is provided on its rear surface not facing a heat source with a liquid absorbing layer for absorbing a solution supplied thereto for concentration, and at least one condensation thin plate which has a good thermal conductivity and is provided with a liquid absorbing layer on at least one surface thereof, the heat receiving plate and the condensation plate or plates being arranged in parallel spaced relationship with each other and each of them being partly formed with at least one groove for supplying the solution to be concentrated to the liquid absorbing layers. A dilute solution supplied to and impregnated in the liquid absorbing layers through the grooves is concentrated by the heat supplied to the heat receiving plate or the latent heat of condensation released to the condensation plate.

10 Claims, 18 Drawing Figures

CONCENTRATING APPARATUS

BACKGROUND OF THE INVENTION

The present invention relates to a novel concentrating apparatus, and more particularly to an apparatus which is thermally efficient and simple in construction for concentrating dilute solutions.

An object of the invention is to provide a concentrating apparatus capable of giving concentrates with a high thermal efficiency.

Another object of the invention is to provide an apparatus for concentrating dilute solutions with use of a low-temperature heat source without the necessity of boiling or evaporation in a vacuum.

Another object of the invention is to provide a concentrating apparatus which need not be resistant to pressure but is simple in construction.

These and other objects of the invention will become apparent from the following description and accompanying drawings.

SUMMARY OF THE INVENTION

The present invention provides a concentrating apparatus comprising a heat receiving thin plate having a high thermal conductivity, the heat receiving thin plate being provided on its rear surface not facing a heat source with a solution absorbing layer for absorbing a solution supplied thereto for concentration, and a condensation thin plate having a high thermal conductivity and provided with a condensate absorbing layer spaced apart from the solution absorbing layer in facing relation thereto, the condensation thin plate being partly formed with at least one groove for supplying the solution to the solution absorbing layer. According to a preferred embodiment of the invention, at least one intermediate thin plate is provided between and spaced apart from the heat receiving thin plate and the condensation thin plate. The intermediate thin plate has a liquid absorbing layer on at least one surface thereof and is partly formed with at least one groove for supplying the solution to be concentrated.

DETAILED DESCRIPTION OF THE INVENTION

The concentrating apparatus of this invention is suitable for concentrating dilute aqueous solutions of salts including alkali metal halides, such as lithium iodide and sodium chloride, and alkaline earth metal halides, such as calcium chloride and magnesium chloride. The apparatus is also usable for other aqueous solutions and solutions of organic solvents.

The heat source to be used is not in any way limited but can be, for example, any of natural heat sources, such as geothermal heat, hot spring heat and solar heat, and waste heat from plants. While some concentration efficiency can be achieved when the heat source has a temperature of at least about 40° C., it is usually preferable to use a heat source having a temperature of about 100° C.

The thin plates to be used in this invention serve the functions of heating and condensation and have a high thermal conductivity. The thin plates are made of a material which is resistant to corrosion when exposed to the solution to be concentrated. For use with aqueous solutions of metal halides, examples of useful materials are corrosion-resistant stainless steel, titanium and Monel metals. Also usuable are sheets or films of heat-resistant plastics, such as polypropylene, fluorine-containing resin and Nylon. The thickness of the thin plates, although varying with the material, is preferably about 0.1 to about 10 mm.

For concentrating aqueous solutions, the absorbing layers are made of organic or inorganic materials, as a wick, capable of absorbing water satisfactorily, such as cloth, felt, sponge, polyvinyl formal fiber, Nylon fiber, cellulose fiber, carbon fiber, asbestos, glass wool, stainless steel fibrous material, graphite containing urethane, plastic foams, etc. The absorbing layer is formed by affixing a sheet of such material to the thin plate. The layer can be formed also by flocking the thin plate with short fibers of such material. For concentrating organic solvent solutions, those of the above materials which will not be attacked by such solutions are usable as absorbing layers. Preferably the absorbing layers have a thickness of about 0.1 to about 10 mm.

The apparatus of the invention concentrates a dilute solution in the space between thin plates having different temperatures, through the cycle of: heating→evaporation (absorption of heat)→heat transfer by vapor→condensation (release of heat).

The concentrating system will be described below with reference to the basic embodiment shown in FIG. 1A. For a better understanding, the following description will be given of the case wherein an aqueous solution is used as the solution to be concentrated. Accordingly the solution to be concentrated is a dilute aqueous solution, and the condensate is water. Of the two surfaces of each thin plate, the surface facing a heat source will be referred to as "front".

According to the invention, the dilute solution absorbing layer to which the solution to be concentrated is supplied is provided on the rear surface of the thin plate at all times and will hereinafter be indicated by S with an adscript. The condensate absorbing layer is formed always on the front surface of each thin plate other than the heat receiving plate and will hereinafter be indicated by W with an adscript.

Figure 1A:
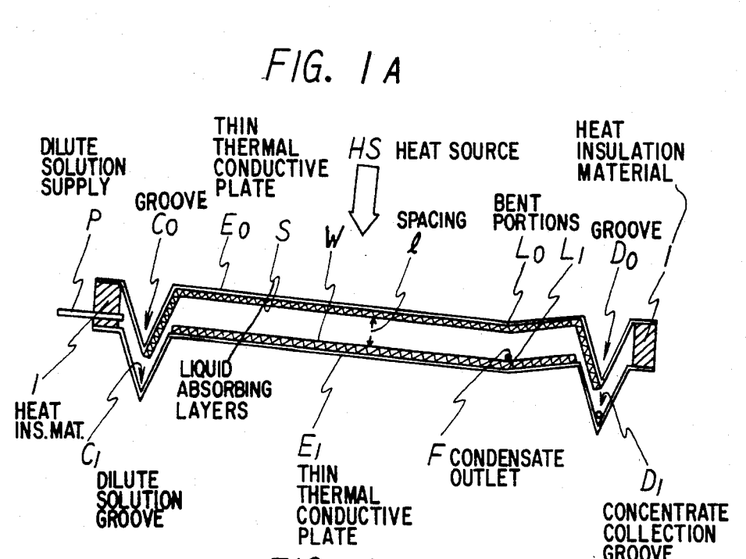
FIG. 1A is a sectional diagram showing the fundamental embodiment of the invention.

With reference to FIG. 1A, a heat source HS is positioned above the apparatus shown. Accordingly a thin plate E0 is located close to the heat source and serves as a heat receiving plate. A thin plate E1 is positioned at a location of lower temperature to serve as a condensation plate. The two thin plates E0 and E1 are connected together at their edge portions by heat insulating members 1 forming side walls to define an evaporation-condensation chamber.

The thin plates E0 and E1 are folded to a V shape in section at each of their opposite end portions to form grooves C0, D0 and C1, D1 respectively. The groove C1 is used for the dilute solution to be concentrated, and the groove D1 is for the resulting concentrate. Each of the thin plates is bent at an obtuse angle at a portion thereof between the opposite grooves and closer to the concentrate groove to form an indented bent portion L1 for the condensate. The thin plates E0 and E1 are so arranged that the solution groove C1 is at a higher level than the concentrate groove D1.

A dilute solution absorbing layer S affixed to the rear surface of the heat receiving thin plate E0 extends from the lowermost bottom portion of the groove C0 of the thin plate E0 to the lowermost bottom portion of the groove D0 of the plate E0. A condensate absorbing layer W affixed to the front surface of the condensation thin plate E1 extends from the edge portion of the groove C1 to the edge portion of the groove D1. In the interior surrounded by the thin plates E0 and E1 and the heat insulating members 1, the absorbing layers S and W are opposed to each other at a spacing l. The spacing l is usually about 1 to about 50 mm although varying with the kind of the solution to be concentrated, the temperature of the heat source and many other factors. The spacing l is the distance of the vapor evaporating off the dilute solution travels before condensing after separating from the solute. The shorter the distance, the lower is the resistance encountered and the higher is the concentration efficiency. The apparatus of this invention is of rigid construction wherein the spacing l can be minimized.

The dilute solution to be concentrated is supplied to the groove C1 through a pipe P, impregnates the absorbing layer S and flows downward along the slope of the thin plate toward the bent portion L0. While so flowing, the solution is heated by the thin plate E0 which in turn is heated by the heat source and concentrated by the evaporation of water. After descending to the bent portion L0, the concentrate temporarily ascends and then descends again along the slope of the groove D0. Upon reaching the extermity of the bottom of the groove D0, the concentrate falls dropwise into the groove D1 therebelow. The concentrate collected in the groove D1 is discharged from the apparatus by a pipe or like means.

The water vapor produced condenses upon contact with the absorbing layer W. The condensate absorbed by the layer W flows down the slope of the thin plate E1, collects at the bent portion L1 and is discharged from the apparatus through an outlet F by capillarity or the principle of a siphon.

The heat of the heat source can be utilized efficiently when a film for selectively absorbing heat is formed over the front surface of the heat receiving thin plate E0.

The condensation thin plate E1 may be formed over the rear surface thereof with a liquid absorbing layer for passing water or like cooling liquid therethrough to cool the plate E1. Alternatively the condensation plate can be cooled, for example, with air.

An improved concentration efficiency can be achieved by a multi-stage structure including evaporation-condensation chambers in layers. Such a multi-stage concentrating apparatus comprises at least one intermediate thin plate provided between a heat receiving thin plate and a condensation thin plate. The intermediate thin plate has a liquid absorbing layer on one or each of its opposite surfaces and is spaced apart from the absorbing layers of the adjacent thin plates.

In this case, a dilute solution is concentrated between the thin plates of different temperatures through the cycle of: heating→evaporation (absorption of heat)-→heat transfer by vapor→condensation (release of heat)→heat transfer through thin plate→evaporation (absorption of heat) . . . .

Figure 1B:
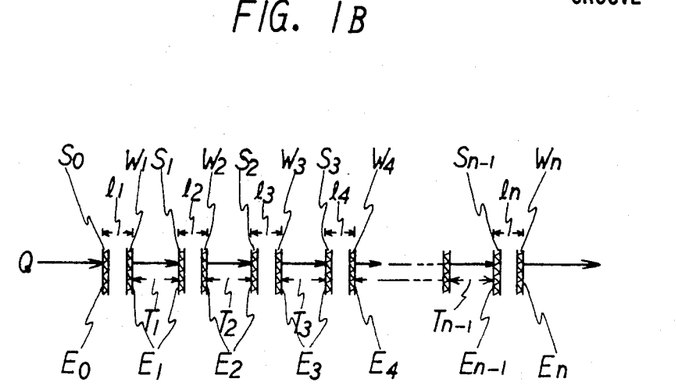
FIG. 1B is a diagram illustrating a concentrating system of the multi-stage type including intermediate thin plates.

This cycle will be described with reference to FIB. 1B, wherein the distance of heat transfer is represented by T with an adscript, and the distance of travel of vapor by l with an adscript.

According to a preferred mode of embodying the present invention, the apparatus is characterized in that heat transfer distances $T_1$ to $T_{n-1}$ and distances of travel of vapor $l_1$ to $l_n$ are made approximate to zero to cause evaporation and condensation, i.e. absorption and release of heat, alternately in a chain-like fashion.

This chain-like action continues infinitely in an ideal state involving no heat loss but gradually attenuates when conducted actually. Accordingly the ideal state can be simulated to achieve an increased thermal efficiency when the heat transfer distance T and the distance of travel of vapor l are made approximate to zero as in the present embodiment.

Heat Q is transmitted through an arrangement of thin plates E0 to En from one side thereof closer to the heat source to the other side. The concentrating system between the thin plate E0 having a dilute solution absorbing layer S0 and the thin plate E1 having a condensate absorbing layer W1 and a solution absorbing layer S1 is the same as the system already described with reference to FIG. 1A.

The heat released to the absorbing layer W1 is transferred to the absorbing layer S1 over the distance T1 which is substantially equal to the thickness of the thin plate E1 to heat and evaporate the solution in the absorbing layer S1. The heat is thereafter transferred to the thin plate E2 through the same system as described with reference to FIG. 1A.

Thus the heat is transferred from plate to plate in succession in a chain-like manner and finally released from the apparatus through the thin plate En.

With the present embodiment, the concentrate may be drawn off from each stage independently, or the concentrate resulting from one stage may be supplied to another stage in succession to increase the concentration.

While other embodiments of the apparatus of the invention will be described below with reference to the other deawings, the invention is not limited only to these embodiments.

Figure 2A:
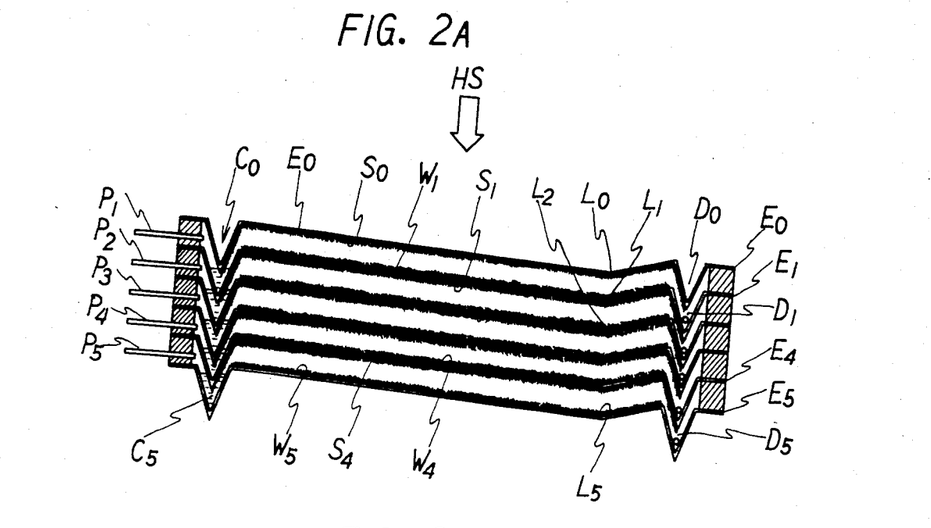
FIGS. 2A and 2B are sectional diagrams showing multi-stage concentrating apparatus embodying the invention and including intermediate thin plates.
Figure 2B:
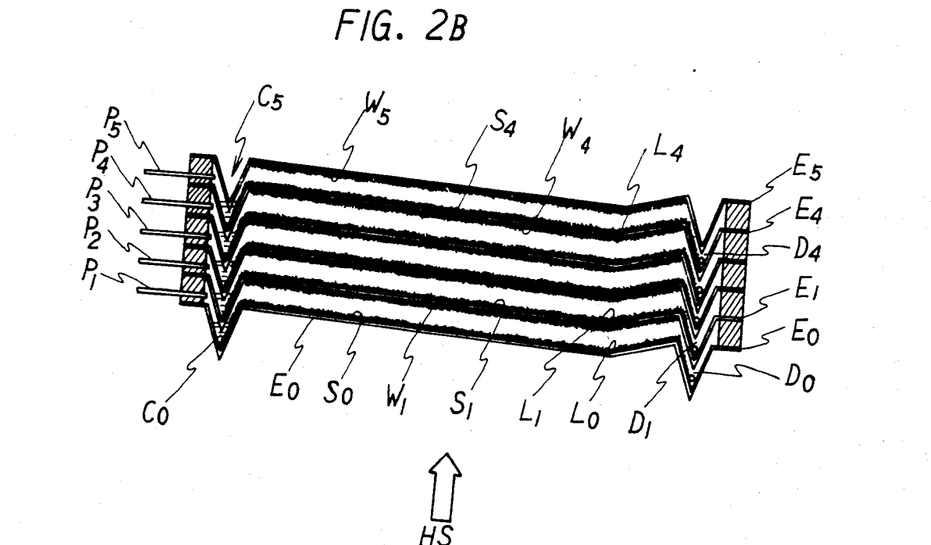

FIGS. 2A and 2B are sectional views schematically showing embodiments of one type according to the invention.

The embodiment shown in FIG. 2A corresponds to the embodiment of FIG. 1A having four intermediate thin plates inserted therein. The thin plates are inclined with respect to a horizontal plane.

The thin plates E0 to E5 are folded to a V shape in section at each of their opposite end portions to form grooves C0 to C5 for supplying the dilute solution to be concentrated and grooves D0 to D5 for withdrawing the resulting concentrate. At a location between the opposite grooves and closer to the grooves D0 to D5 for the concentrate, the thin plates are bent at an obtuse angle to form indented bent portions L0 to L5 for the condensate. The thin plates E0 to E5 are so arranged that the grooves C0 to C5 for the solution are at a higher level than the grooves D0 to D5 for the concentrate.

All the thin plates E0 to E4 except for the lowermost plate E5 are provided on the rear surfaces (lower surfaces in FIG. 2A) thereof with dilute solution absorbing layers S0 to S4 extending from the bottom extremities of the grooves C0 to C4 to the bottom extremities of the grooves D0 to D4. Condensate absorbing layers W1 to W5 affixed to the front surfaces (upper surfaces in FIG. 2A) of the thin plates E1 to E5 other than the uppermost plate E0 extend from the edges of the grooves C1 to C5 to the edges of the grooves D1 to D5.

The thin plates E0 to E5 are arranged in layers with surrounding heat insulating members interposed therebetween to hold the adjacent absorbing layers out of contact with each other.

The dilute solution to be concentrated is supplied to the grooves C1 to C5 through pipes P1 to P5 respectively. The solution supplied to the grooves C1 to C5 impregnates the absorbing layers S0 to S4. The solution impregnated in the absorbing layer S0 flows down the slope of the thin plate E0 toward the bent portion L0. While so flowing, the solution is heated by the plate E0 heated by the heat source and is concentrated by the evaporation of water. Similarly the solution absorbed by the absorbing layers S1 to S4 is heated by the latent heat of condensation released to the intermediate thin plates E1 to E4 and is concentrated upon evaporation of water. After descending to the bent portions, the concentrate temporarily ascends and then descends again along the slope of the grooves D0 to D4. Upon reaching the extremities of the bottoms of the grooves D0 to D4, the concentrate falls dropwise into the grooves D1 to D5 therebelow. The concentrate collected in the grooves D1 to D5 is discharged from the apparatus by pipes or like means.

The water vapor produced condenses upon contact with the absorbing layers W1 to W5. The condensate absorbed by the layers W1 to W5 flows down the thin plates E1 to E5 along the slope thereof and is collected at the bent portions L1 to L5. In the case of the apparatus of this type, the absorbing layers W1 to W5 need not always be provided; the condensate produced on the front surfaces of the thin plates may be allowed to flow down along the slope thereof and collected at the bent portions L1 to L5. The condensate collected at the bent portions is discharged from the apparatus by suitable means, for example, by capillarity or the principle of a siphon.

The present embodiment employs the same concentrating system as described with reference to FIG. 1B.

While the dilute solution is concentrated only once between the adjacent thin plates according to the present embodiment, the concentrate discharge pipe in each stage can be connected to the dilute solution supply pipe for the next lower stage to concentrate the solution stepwise.

Generally the amount of heat supplied to the heat receiving plate is consumed for evaporating the dilute solution impregnated in the absorbing layer on the rear surface of the plate and is also taken away by the resulting concentrate and condensate as their temperature. Accordingly the heat absorbed by the condensate and concentrate should be recovered to the greatest possible extent by a heat exchanger. However, it is impossible to recover the heat 100%, and about 10% of the supplied heat is usually lost. The amount of heat $Q_n$ released upon condensation of vapor in the condensate absorbing layer on each of the thin plates E1 to E5 is given by the following equation (I).

$$Q_n = Q_0 x f^n \qquad (I)$$

wherein $Q_0$ is the amount of heat initially given, n is the number of evaporation stages, and f is an attenuation ratio which is usually 0.85 to 0.95. The ratio of evaporation or concentration is in proportion to the amount of heat $Q_n$ and reduces with the increase of the number of evaporation stages.

Accordingly when the solution to be concentrated is supplied to each stage in the proportion of the attenuation ratio f multiplied by the number of stages concerned instead of supplying equal amounts of solution to all the stages, excesses of solution will not be supplied to achieve an increased concentration efficiency.

Further if the solution to be concentrated is supplied to each stage as heated to a temperature higher than the temperature of the resulting condensate and concentrate, the amount of heat removed by the condensate and concentrate in each stage can be fully compensated for, so that the quantity of condensate will not decrease from stage to stage. Thus the concentration efficiency can be improved effectively also by supplying the dilute solution at a relatively high temperature.

FIG. 2B shows an embodiment in which a heat source HS is disposed below the lowermost thin plate E0 which therefore serves as a heat receiving plate. Dilute solution absorbing layers S0 to S4 are provided on the rear surfaces (upper surfaces in FIG. 2B) of thin plates E0 to E4, and condensate absorbing layers W1 to W5 on the front surfaces (lower surfaces in FIG. 2B) of the thin plates E1 to E5. This embodiment has the same construction as the one shown in FIG. 2A with the exception of these features.

Figure 3A:
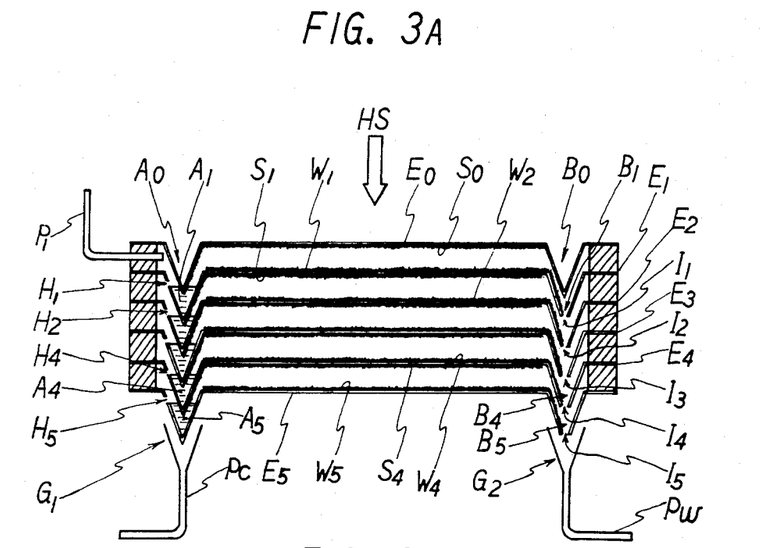
FIGS. 3A and 3B are sectional diagrams showing other embodiments of the invention.
Figure 3B:
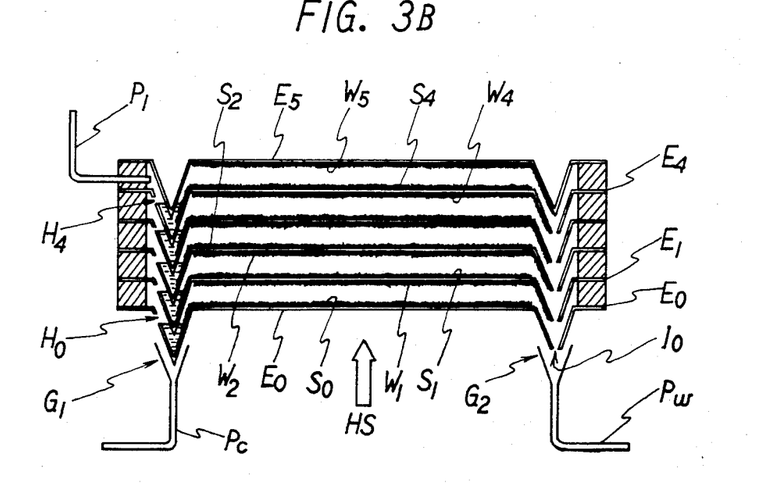
Figure 3C:
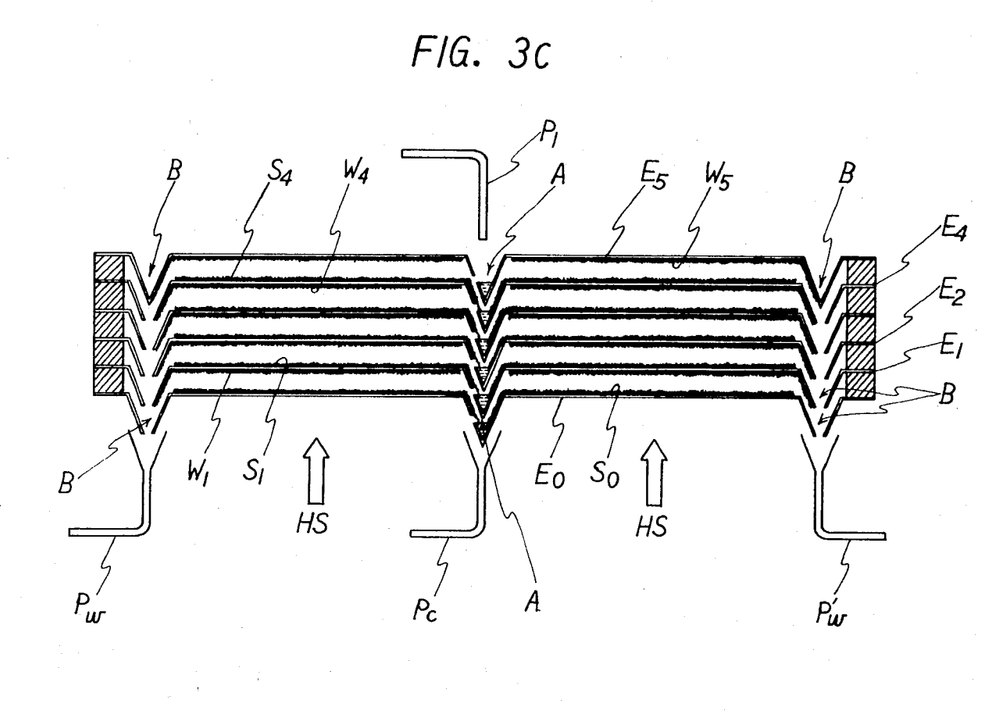
FIG. 3C is a sectional diagram showing another embodiment similar to the one shown in FIG. 3B.

FIGS. 3A to 3C are sectional views schematically showing embodiments which differ in type from those shown in FIGS. 2A to 2B.

The embodiment shown in FIG. 3A has a radiant heat or like heat source HS disposed above an arrangement of thin plates including four intermediate thin plates. The thin plates are arranged horizontally and have no bent portions.

The thin plates E0 to E5 are folded to a V shape in section at each of their opposite end portions to form grooves A0 to A5 for the dilute solution to be concentrated and grooves B0 to B5 for the resulting concentrate.

All the thin plates E0 to E4 except for the lowermost plate E5 are provided on the rear surfaces (lower surfaces in FIG. 3A) thereof with dilute solution absorbing layers S0 to S4 extending from the bottom extremities of the grooves A0 to A4 to the edges of the grooves B0 to B4. Condensate absorbing layers W1 to W5 affixed to the front surfaces (upper surfaces in FIG. 3A) of the thin plates E1 to E5 other than the uppermost plate E0 extend from the edges of the grooves A1 to A5 to the bottom extremities of the grooves B1 to B5.

The thin plates E0 to E5 are arranged in layers with surrounding heat insulating members interposed therebetween to hold the adjacent absorbing layers out of contact with each other.

Overflow holes H1 to H5 are formed in upper portions of slanting walls defining the solution grooves A1 to A5. The overflow hole in each of the thin plate is positioned at a higher level than the bottom of the groove of the next higher thin plate. Openings I1 to I5 are formed in the bottoms of the condensate grooves B1 to B5.

The dilute solution to be concentrated is supplied through a pipe P1 to the groove A1 to fill the groove A1 and overflows through the hole H1 to fill the groove A2. Similarly the dilute solution overflowing through the holes H2 to H4 fills the grooves A3 to A5 in succession.

When the grooves A1 to A5 are filled with the solution, the solution is absorbed by the absorbing layers S0 to S4 affixed to the rear surfaces of the grooved portions A0 to A4 and impregnates the layers entirely.

When the uppermost thin plate E0 is heated by the heat source HS, the dilute solution impregnated in the layer S0 is heated and concentrated upon the evaporation of water. Through diffusion, the concentrate increases the concentration of the dilute solution in the groove A1. Since fresh dilute solution is supplied from the pipe P1 continuously or intermittently, the resulting concentrate overflows through the hole H1 into the groove A2.

On the other hand, the water vapor produced reaches the condensate absorbing layer W1 on the front surface of the opposed thin plate E1, whereupon the vapor is condensed and absorbed by the layer W1. By virtue of capillarity and the principle of siphon, the absorbed condensate flows into the groove B1 and falls dropwise into the groove B2 through the bottom opening I1.

The thin plate E1 having a good thermal conductivity is heated by the latent heat of condensation of the water vapor released to the layer W1. The heat is transferred to the dilute solution absorbed by the solution absorbing layer S1 on the rear side of the thin plate E1 to concentrate the solution by the evaporation of water.

Similarly the solution is concentrated between the thin plates E1 and E2, E2 and E3, and E3 and E4. While the solution is concentrated similarly also between the thin plate E4 and the lowermost thin plate E5, the latent heat of condensation released to the condensate absorbing layer W5 is released from the apparatus through the thin plate E5.

The concentrate collected in the groove A5 of the thin plate E5 overflows through the hole H5 and is led into a pipe Pc by a trough G1. When needed, the concentrate may further be circulated through the apparatus and concentrated to the desired concentration. However, if the solution is concentrated to excess, crystals of solutes such as salts are likely to deposit in the absorbing layers, hence undesirable.

The condensate collected in the groove B5 falls in drops through the bottom opening I5 of the groove B5 and is led into a pipe Pw by a trough G2.

FIG. 3B shows an embodiment which is a modification of the embodiment of FIG. 3A and which has a heat source HS arranged on the lower side of the drawing and the lowermost thin plate E0 serving as a heat receiving thin plate. Accordingly dilute solution absorbing layers S0 to S4 are provided on the rear surfaces (upper surfaces in FIG. 3B) of thin plates E0 to E4, and condensate absorbing layers W1 to W5 on the front surfaces (lower surfaces in FIG. 3B) of the thin plates E1 to E5. The present embodiment has the same construction as the one shown in FIG. 3A with the exception of these features.

FIG. 3C shows an embodiment in which grooves of V-shaped section are arranged in three rows which are spaced apart. The dilute solution to be concentrated is supplied from a pipe P1 to the central grooves A. The condensate is drawn off from the lower ends of the grooves B on the opposite sides, and the concentrate from the lower ends of the grooves A. With the exception of these features, the embodiment is the same as the one shown in FIG. 3B.

Figure 7:
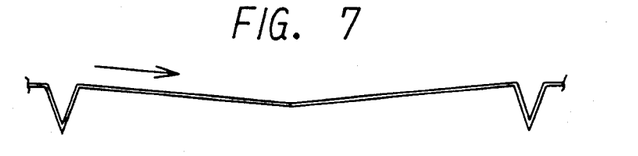
Figure 8:
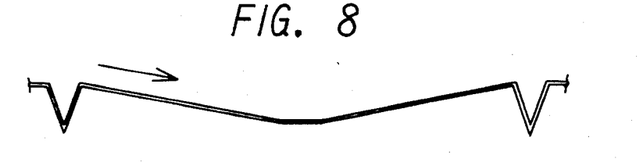
Figure 9A:
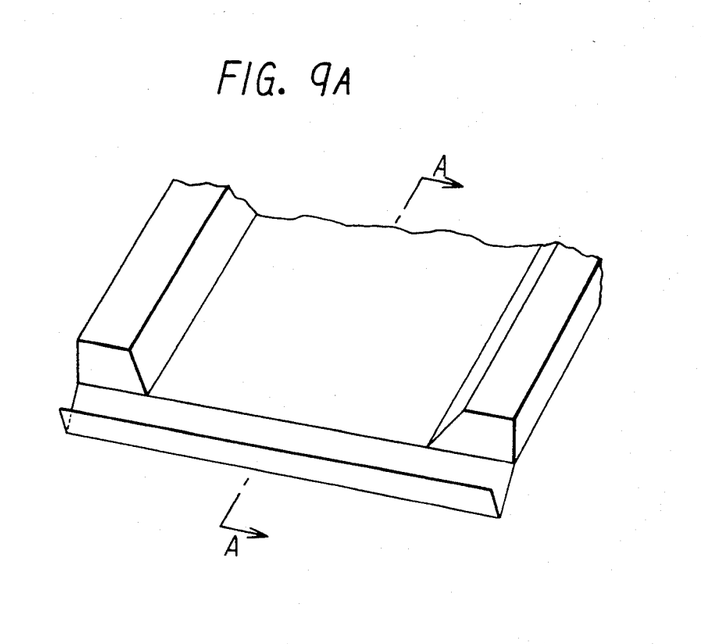
FIG. 9A is a fragmentary perspective view showing a thin plate of different shape.
Figure 9B:
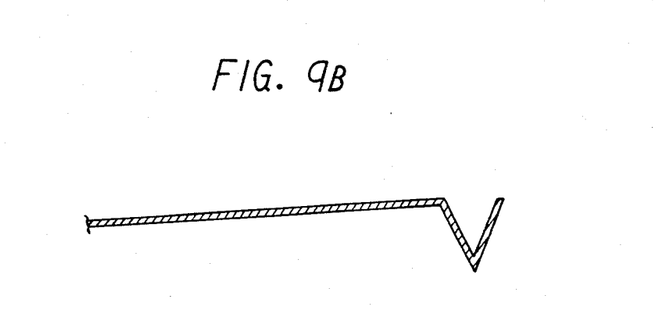
FIG. 9B is a view in section taken along the line A—A in FIG. 9A.

FIGS. 4 to 8 are sectional views schematically showing thin plates of various shapes, FIG. 9A is a fragmentary perspective view showing another thin plate of different shape, and FIG. 9B is a view in section taken along the line A—A in FIG. 9A.

These thin plates are suited for use in the embodiments of the types shown in FIGS. 1A, 2A and 2B.

Figure 4:
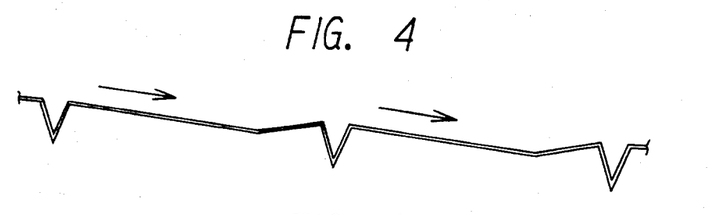
FIGS. 4 to 8 are sectional diargrms individually showing thin plates useful for the apparatus of the invention.
Figure 5:
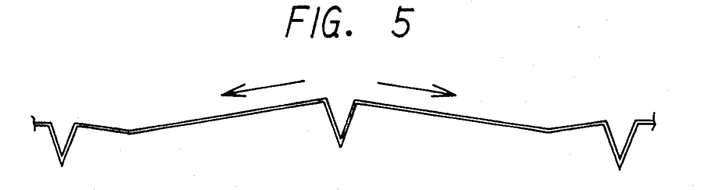
Figure 6:
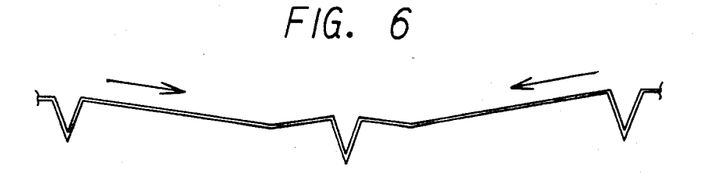

FIGS. 4 to 6 show embodiments in which the same thin plates as shown in FIGS. 2A and 2B are arranged continuously with their grooves positioned at different levels. With the embodiment shown in FIG. 4, the grooves are at successively lower levels. The solution to be concentrated is supplied to the groove at the highest level, i.e. to the groove formed at one end of the thin plate, and the concentrate is drawn off from the groove formed at the other end. The condensate is drawn off from the bent portions.

With the embodiment shown in FIG. 5, the groove formed approximately in the center of the thin plate is at the highest level, and preferably, an equal number of grooves are formed on each side of the center groove. The grooves formed at the opposite ends of the plate are the lowest. The solution to be concentrated is supplied to the center groove at the highest level, and the concentrate is drawn off from the grooves at the opposite ends. The condensate is taken out from the bent portions.

With the embodiment shown in FIG. 6, the thin plate has opposite ends which are at the highest level and extends gradually downward toward its center. The solution to be concentrated is supplied to the grooves at the opposite ends, while the concentrate is drawn off from the center groove. The condensate is drawn off from the bent portions.

FIG. 7 shows a thin plate having grooves at its opposite ends and a center portion which is bent at an obtuse angle. The solution to be concentrated is supplied to one of the grooves, the concentrate is run off from the other groove and the condensate is drawn off from the bent center portion.

The embodiment shown in FIG. 8 is the same as the one shown in FIG. 7 except that the thin plate is bent at two central portions to provide a flat midportion. The solution to be concentrated is supplied and the concentrate and condensate are drawn off all in the same manner as in FIG. 7.

FIG. 9A shows an embodiment which is raised at the widthwise opposite sides and is formed, at one of its longitudinally opposite ends, with a groove of V-shaped section for supplying the solution to be concentrated. The grooved end is at a higher level than the other end. The concentrate and the condensate can be collected separately by the means to be described later with reference to FIGS. 11 to 13. FIG. 9B is a view in section taken along the line A—A in FIG. 9A.

Figure 10:
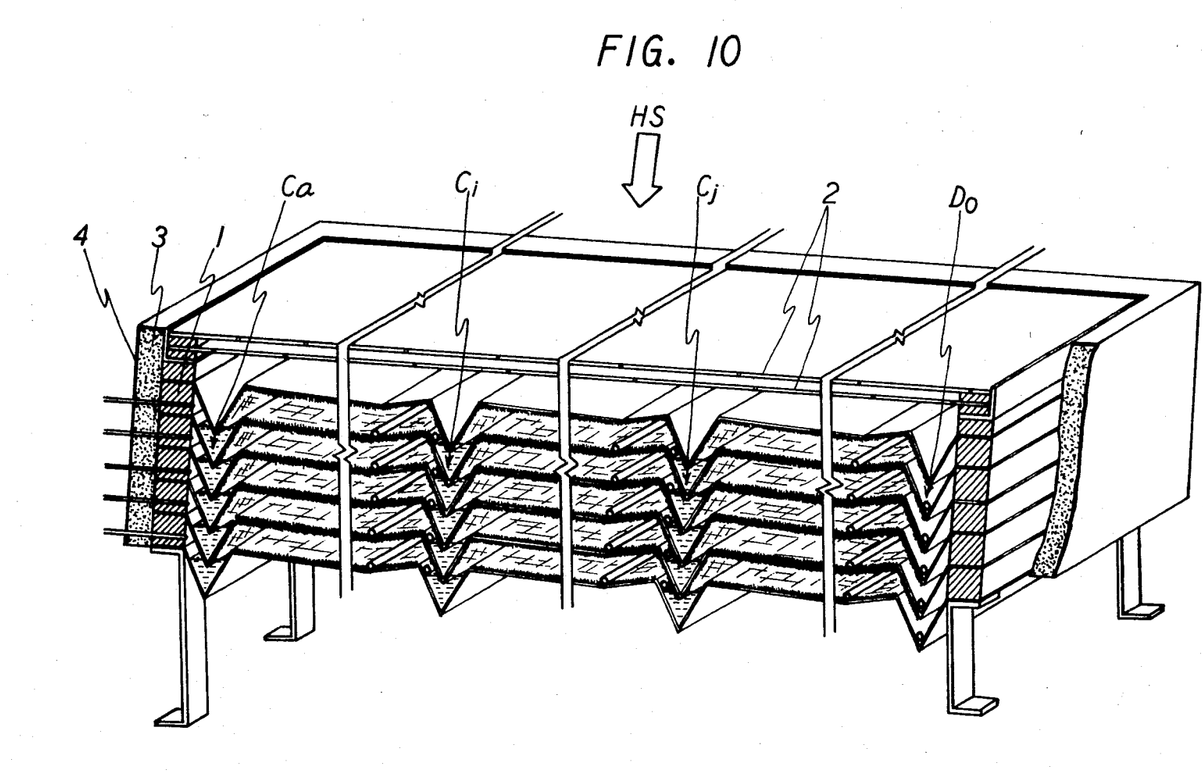
FIG. 10 is a perspective view partly in section and showing an embodiment including thin plates of the type shown in FIG. 4.

FIG. 10 is a perspective view partly in section and showing another embodiment of the invention including six thin plates of the type shown in FIG. 4.

With the present embodiment, each thin plate has a number of grooves Ca to Cj and Do which are at successively lower levels from the groove Ca toward the groove Do. The dilute solution to be concentrated is supplied first to the groove Ca at the highest level and then to the grooves Ci and Cj in suitable quantities at a progressively increasing concentration, whereby the solution to be concentrated can be preheated by the elevated temperature of the concentrate to achieve an improved thermal efficiency.

The embodiment is adapted to be heated from above. Solar radiant heat, for example, is utilized as a heat source HS. Accordingly the casing has a top cover 2 which is made of glass, transparent plastic or like material permitting efficient passage of solar rays and like radiant heat. The side portions of the casing are made up of corrosion resistant heat insulating members 1 for holding the thin plates, an outer heat insulating member 3 and a heat insulating cover 4 as arranged from inside outward. With the casing thus formed, the heat from the heat source can be transferred to the thin plates efficiently.

Figure 11:
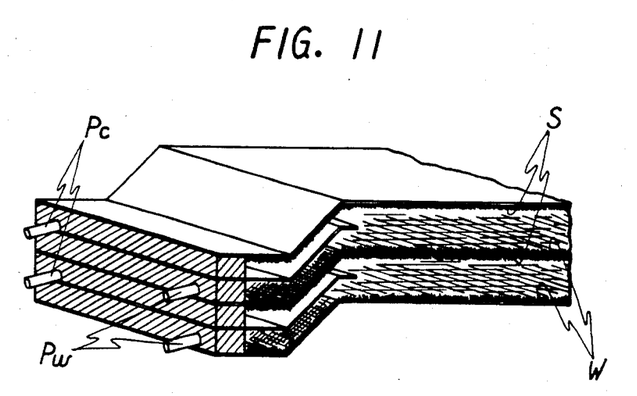
FIGS. 11 to 13 are sectional diagrams each showing means for withdrawing concentrate and condensate separately for use in the apparatus of the invention.
Figure 12:
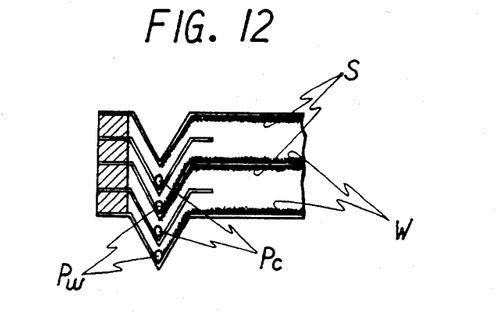
Figure 13:
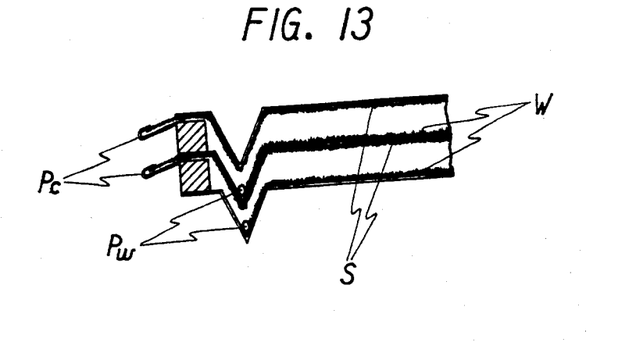

FIGS. 11 to 13 are sectional views schematically showing different embodiments of means for withdrawing the concentrate and the condensate for use in the apparatus of the invention. In each of FIGS. 11 to 13, a heat source HS is arranged on the upper side of the drawing. Accordingly dilute solution absorbing layers S are affixed to the rear surfaces (lower surfaces in each of FIGS. 11 to 13) of the thin plates shown. Condensate absorbing layers W are affixed to the front surfaces (upper surfaces in each of FIGS. 11 to 13) of the thin plates. In FIGS. 11 to 13, indicated at Pc are pipes or troughs for withdrawing the concentrate, and at Pw pipes for drawing off the condensate. When the heat source HS is located on the lower side of the drawing, the solution absorbing layers S and the condensate absorbing layers W are replaced by each other.

As another mode of embodying the present invention, the embodiment shown in FIG. 1 may be used as a unit. Such units are arranged in layers or connected together by suitable means as arranged laterally to provide a multi-stage apparatus or an apparatus of increased width.

The number of intermediate thin plates is variable with the kind of the heat source, the kind and concentration of the solution to be concentrated, the concentration of the concentrate to be formed, etc. and is determined in accordance with such conditions.

The concentrating apparatus of the invention is useful for preconcentrating dilute aqueous solutions for the reuse of lithium iodide, calcium chloride, etc. used as dehumidifiers, for preconcentration to recover traces of useful components such as iodine, bromine, magnesium and uranium from seawater, and is also useful as part of energy storage systems based on concentration differences.

Apparatus of the types shown in FIGS. 2A, 3A and 10 were used for concentrating an aqueous solution of sodium chloride having a concentration of 3.2% (by weight, the same as hereinafter). The results are given in Tables 1 to 3. The specifications of the apparatus and the heat sources are as follows:

FIG. 2A TYPE

Specification

Thin plates: corrosion resistant stainless steel plates, 0.9 m×3 m×0.4 mm

Number of stages: 15

Absorbing layers: 1 mm thick nonwoven fabric of Nylon fibers

Spacing between absorbing layers: 4 mm

Heat source

Radiant solar heat (heat supply: 1885 kcal/hr/apparatus, surface temperature of heat receiving plate: 86.4° C.)

The apparatus was brought into steady-state operation two hours after the start of heating. Table 1 shows the amount of solution supplied to each stage and the amounts of concentrate and condensate obtained from each stage.

TABLE 1

| Stage | Supply of solution (cc/hr) | Amount of concentrate (cc/hr) | Amount of condensate (cc/hr) | Concn. of concentrate (%) |
|---|---|---|---|---|
| 1 | 2387 | 557 | 1830 | 13.72 |
| 2 | 2242 | 531 | 1711 | 13.52 |
| 3 | 1902 | 450 | 1452 | 13.54 |
| 4 | 1836 | 435 | 1401 | 13.50 |
| 5 | 1824 | 432 | 1392 | 13.51 |
| 6 | 1595 | 377 | 1218 | 13.54 |
| 7 | 1372 | 325 | 1047 | 13.51 |
| 8 | 1308 | 307 | 1001 | 13.62 |
| 9 | 1175 | 278 | 896 | 13.50 |
| 10 | 1047 | 247 | 803 | 13.63 |
| 11 | 974 | 229 | 745 | 13.61 |
| 12 | 896 | 215 | 682 | 13.36 |
| 13 | 847 | 200 | 647 | 13.54 |
| 14 | 792 | 189 | 603 | 13.44 |
| 15 | 682 | 160 | 522 | 13.67 |
| Total | 20,879 | 4,932 | 15,950 | 13.55 (Average) |

The average concentration of the concentrate and the concentration efficiency were calculated from the following equations.

Average concentration of the concentrate $$= \text{Concn. (\%) of soln. supplied} \times \frac{\text{Supply of soln. (cc/hr)}}{\text{Amount of concentrate (cc/hr)}}$$

$$= 3.2 \times \frac{20,879}{4,932} = 13.55 \, (\%)$$

Concentration efficiency $$= \frac{\text{Amount of condensate (l/hr)} \times \text{Latent heat of evaporation (kcal/l)}}{\text{Heat supplied (kcal/l)}} \times 100 \, (\%)$$

$$= \frac{15.95 \times 560}{1885} \times 100 = 473.85 \, (\%)$$

FIG. 3A TYPE

Specifications

Thin plates: corrosion resistant stainless steel plates, 0.33 m×3.0 m×0.4 mm

Number of stages: 15

Absorbing layers: 1 mm thick nonwoven fabric of Nylon fibers

Spacing between absorbing layers: 4 mm

Heat source

Radiant solar heat (heat supply: 630 kcal/hr/apparatus, surface temperature of heat receiving plate: 87° C.)

Solution to be concentrated 3.2% Aqueous solution of sodium chloride

The solution was concentrated under the above conditions with the results listed in Table 2. The apparatus achieved a concentration efficiency of 534%.

TABLE 2

| Stage | Supply of solution (cc/hr) | Amount of condensate (cc/hr) | Concentrate Amount (cc/hr) | Concentration (%) |
|---|---|---|---|---|
| 1 | 8200 | 670 | 7530 | 3.48 |
| 2 | | 618 | 6912 | 3.79 |
| 3 | | 587 | 6325 | 4.14 |
| 4 | | 528 | 5797 | 4.52 |
| 5 | | 480 | 5317 | 4.93 |
| 6 | | 442 | 4875 | 5.38 |
| 7 | | 398 | 4477 | 5.86 |
| 8 | | 370 | 4107 | 6.39 |
| 9 | | 344 | 3763 | 6.97 |
| 10 | | 327 | 3436 | 7.63 |
| 11 | | 301 | 3135 | 8.36 |
| 12 | | 274 | 3861 | 9.16 |
| 13 | | 247 | 2614 | 10.04 |
| 14 | | 222 | 2392 | 10.97 |
| 15 | | 199 | 2193 | 11.97 |
| Total | 8,200 | 6,007 | 2,193 | 11.97 (Final concn.) |

FIG. 10 TYPE

Specification

Thin plates: three blocks of thin plates connected together laterally and each comprising corrosion resistant stainless steel plates, 0.9 m×3 m×0.4 mm Number of stages: 15

Absorbing layers: 1 mm thick nonwoven fabric of Nylon fibers

Spacing between absorbing layers: 4 mm

Heat source

Radiant solar heat (heat supply: 1885 kcal/hr/apparatus, surface temperature of heat receiving plate: 86° C.)

Solution to be concentrated 3.2% Aqueous solution of sodium chloride

The solution was concentrated under the above conditions with the results listed in Table 3. The apparatus achieved a concentration efficiency of 536%.

TABLE 3

| Stage | Supply of solution (cc/hr) | First block Amount of condensate (cc/hr) | First block Concentrate Amount (cc/hr) | First block Concentrate Concn. (%) | Second block Amount of condensate (cc/hr) | Second block Concentrate Amount (cc/hr) | Second block Concentrate Concn. (%) | Third block Amount of condensate (cc/hr) | Third block Concentrate Amount (cc/hr) | Third block Concentrate Concn. (%) | Total amount of condensate in each stage (cc/hr) |
|---|---|---|---|---|---|---|---|---|---|---|---|
| 1 | 2520 | 650 | 1870 | 4.31 | 677 | 1193 | 7.12 | 734 | 459 | 17.54 | 2061 |
| 2 | 2367 | 638 | 1729 | 4.38 | 640 | 1089 | 7.08 | 659 | 430 | 17.63 | 1937 |
| 3 | 2008 | 534 | 1474 | 4.36 | 550 | 924 | 7.03 | 560 | 364 | 17.65 | 1644 |
| 4 | 1939 | 513 | 1426 | 4.35 | 552 | 874 | 6.90 | 527 | 347 | 17.86 | 1592 |
| 5 | 1926 | 496 | 1430 | 4.31 | 503 | 927 | 7.21 | 575 | 352 | 17.51 | 1574 |
| 6 | 1684 | 473 | 1211 | 4.45 | 466 | 745 | 6.98 | 439 | 306 | 17.62 | 1378 |
| 7 | 1448 | 434 | 1014 | 4.57 | 394 | 620 | 7.02 | 354 | 266 | 17.41 | 1182 |
| 8 | 1382 | 379 | 1003 | 4.41 | 367 | 636 | 7.15 | 384 | 252 | 17.58 | 1130 |
| 9 | 1241 | 343 | 898 | 4.42 | 363 | 535 | 6.74 | 309 | 226 | 17.57 | 1015 |
| 10 | 1108 | 278 | 830 | 4.27 | 287 | 543 | 7.28 | 343 | 200 | 17.74 | 908 |
| 11 | 1029 | 279 | 750 | 4.39 | 277 | 473 | 7.05 | 283 | 190 | 17.37 | 839 |
| 12 | 946 | 253 | 693 | 4.37 | 269 | 424 | 6.82 | 252 | 172 | 17.56 | 774 |
| 13 | 892 | 209 | 683 | 4.18 | 248 | 435 | 7.00 | 275 | 160 | 17.83 | 732 |
| 14 | 836 | 204 | 632 | 4.23 | 241 | 391 | 6.87 | 240 | 151 | 17.67 | 685 |
| 15 | 720 | 190 | 530 | 4.35 | 202 | 328 | 6.95 | 198 | 130 | 17.71 | 590 |
| Total | 22,046 | 5,873 | 16,173 | 4.36 (Avg.) | 6,036 | 10,137 | 7.01 (Avg.) | 6,132 | 4,005 | 17.6 (Avg.) | 18,041 |

What is claimed is:

1. A concentrating apparatus comprising:
a first substantially planar rigid plate having high thermal conductivity and having a first surface adapted to receive heat from a heat source, said first plate having a second surface on the side opposite said first surface provided with a solution-absorbing layer for absorbing a solution supplied thereto for concentration;
a second substantially planar rigid plate having high thermal conductivity and positioned substantially parallel to said first plate and spaced therefrom, and having a first surface facing said second surface of said first plate and provided thereon with a condensate absorbing layer spaced from said solution absorbing layer, said second plate having a second surface on the side opposite said condensate absorbing layer adapted to dissipate heat;
said first and second plates each being formed with a first groove near an edge thereof, said grooves being positioned in corresponding relation to one another, said groove in the lower of said two plates forming a solution supply groove and said solution absorbing layer being arranged to extend into said solution supply groove;
means for supplying a dilute solution to said solution supply groove to be absorbed by said solution absorbing layer; and
means for withdrawing concentrate and condensate from said apparatus.

2. An apparatus as defined in claim 1 further comprising at least one intermediate plate having high thermal conductivity interposed between and substantially parallel to said first and second plates, said intermediate plate having a first surface provided with a solution absorbing layer facing said condensate absorbing layer of said second plate and a second surface provided with a condensate absorbing layer facing said solution absorbing layer of said first plate, and being formed with a first groove correspondingly positioned to said first grooves of said first and second plates and forming a solution supply groove.

3. An apparatus as defined in claim 1 or claim 2 wherein said grooves are formed so that said groove in an upper plate extends below the top of said groove in a lower plate, and said solution absorbing layer is provided on said upper plate and extends into solution contained into said solution supply groove.

4. An apparatus as defined in claim 1, further comprising a second groove formed in each of said plates at a position separated from said first groove, said second groove being arranged to collect concentrate from said solution absorbing layer, and said means for withdrawing concentrate being positioned thereat.

5. An apparatus as defined in claim 4 wherein said plates are positioned at an angle with respect to a horizontal plane.

6. An apparatus as defined in claim 5 where said dilute solution supply groove is positioned at a higher level than said concentrate collection groove.

7. An apparatus as defined in claim 4 wherein each of said plates is bent at an obtuse angle at a portion thereof between said grooves to form an indented portion, and said means for withdrawing concentrate is positioned at said concentrate absorbing layer at said indented portion.

8. An apparatus as defined in any of claims 1, 2, 4, 5, 6 or 7 wherein said plates are connected together at their edge portions by heat insulating members forming side walls to define an evaporation-condensation chamber.

9. An apparatus as defined in claim 1 wherein said first plate is the upper plate.

10. An apparatus as defined in claim 1 wherein said first plate is the lower plate.

* * * * *